United States Patent

[11] 3,602,058

[72] Inventor Brian Beddoe
Pontypool, England
[21] Appl. No. 878,816
[22] Filed Nov. 21, 1969
[45] Patented Aug. 31, 1971
[73] Assignee Imperial Chemical Industries Limited
London, England
[32] Priority Dec. 12, 1968
[33] Great Britain
[31] 59089/68

[54] GEARS HAVING DEFORMABLE AND INDEFORMABLE TEETH
10 Claims, 3 Drawing Figs.
[52] U.S. Cl. .................................................. 74/434, 74/461
[51] Int. Cl. ..................................................... F16h 55/04, F16h 55/14
[50] Field of Search .......................................... 74/434, 461, 443, 410

[56] References Cited
UNITED STATES PATENTS
2,744,417  5/1956  Huguenin ..................... 74/434
2,814,188  11/1957 Fox .............................. 74/434 X
3,206,997  9/1965  Hardy ........................... 74/443 X Primary Examiner—Leonard H. Gerin
Attorney—Cushman, Darby & Cushman ABSTRACT: Composite gearing wherein the load is transferred via hard teeth only when it exceeds a certain level. This is achieved by employing a first set of deformable teeth disposed slightly in advance of the hard teeth.

PATENTED AUG 31 1971 3,602,058

Inventor
BRIAN BEDDOE
By
Cushman, Darby & Cushman
Attorneys

GEARS HAVING DEFORMABLE AND INDEFORMABLE TEETH

The present invention relates to toothed gears and composite gearing incorporating the same. Particularly, though not exclusively, it relates to such composite gearing when used in the draw-roll gearboxes of draw-twisters.

It has been known for some time to use gears made from nonmetals, such as plastic or rubbery materials and the like, for a number of reasons. Such materials may be relatively hard or relatively deformable or soft. Relatively deformable or soft materials are used, among other reasons, in order to reduce noise, which can be quite disturbing when the conventional resilient metal gears are used, especially when such a gear-type force-transferring mechanism is run at high speeds. Polyurethane gears of sufficient rigidity to transmit the pertaining forces, but flexible or deformable enough not to transmit noise vibrations and having the appropriate damping capacity are an example of such noise-reducing gears.

Said relatively deformable gears, however, suffer in practice from several disadvantages, of which the following are very important.

In the first place, said gears are, in general, less resistant to wear than metal gears, especially when excessively loaded, and hence require more frequent replacement.

Secondly, when a high load is applied to the gear teeth said teeth distort and may indeed distort to such an extent that the teeth of adjacent gears slip over one another without driving taking place. Continual intermittent distortion may cause breakdown of said plastic gears.

Applicants have now invented a simple but ingenious means of overcoming the aforesaid problems using composite gearing, and this is one of the objects of the invention.

The present invention therefore, provides in one of its aspects, composite gearing comprising gears adopted for rotation on a common axis or shaft with their sets of teeth arranged side by side, at least one set of teeth being relatively indeformable rigid teeth and at least one other set of teeth being relatively deformable displaceable teeth which latter teeth are so arranged that load-bearing faces of same project forwardly of load-bearing faces of the relatively indeformable teeth to an extent such that the teeth of a meshing gear will first contact said forwardly projecting faces which faces may thereafter yield under pressure to an extent such as to permit the teeth of the meshing gear also to move into driving contact with the faces of the relatively indeformable teeth.

The present invention will now be described in no way limitatively with reference to the drawings, whereof:

One form of the invention will now be described, in no way limitatively, with reference to FIG. 1.

Figure 1:
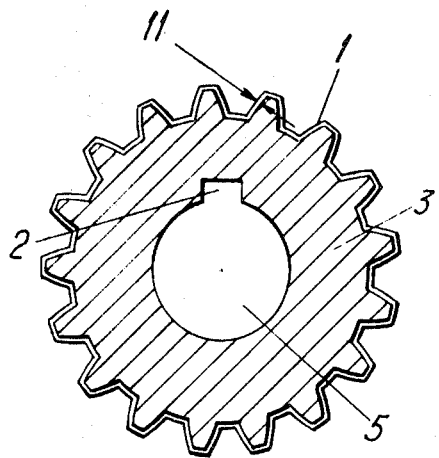
FIG. 1 is a side view of one form of gearing of the present invention.

Referring to FIG. 1, in a gear-type force-transferring mechanism composite gearing comprising two complementary toothed members, one a relatively deformable member 1 made of plastic material and one a relatively rigid, that is to say, relatively indeformable member 3 made of metal, rotates about and is turned by shaft or axis 5, being keyed thereto by the use of recess 2. The plastic gear 1 engages with the plastic gear of similar composite gearing, also having a metal gear and rotating on another shaft of axis. The gear teeth of members 3, slightly less in size than those of members 1, are normally out of contact with one another during operation of the gear mechanism.

The properties of the plastic, relatively deformable displaceable gears involved are chosen such that during normal running conditions the gear teeth are not excessively distorted nor excessively worn by the applied forces while at the same time possessing satisfactory noise-reducing properties.

With the composite gearing of the present invention, as illustrated, when the applied force temporarily becomes excessive the teeth of the plastic gears, e.g. 1 in FIG. 1, are displaced and after a given amount of displacement, determined by the properties of the gear material and the spacing 11 between the outside profiles of the teeth of the plastic and metal gears, engagement occurs between the teeth of the metal gears 3 of the two engaging sets of composite gearing, thus relieving the plastic components of excessive stress and strain. As soon as the temporary overload is removed the composite gearing returns to its original state, with plastic gear driving plastic gear in a quiet manner.

A further very useful advantage of the composite gearing of the present invention is that when the relatively rigid teeth, made for instance of metal, are in engagement, the plastic relatively deformable, displaceable components of said composite gearing, act as dampers for high frequency chatter and other shock effects normally occuring between said rigid teeth, so greatly reducing the wear on said rigid teeth. In practice it is found that a very considerable extension in the life of said rigid teeth, such as those of metal gears, is thus obtainable.

Figure 2:
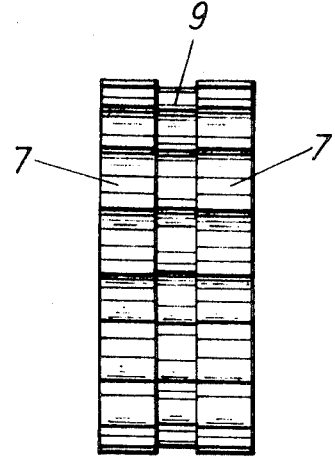
FIG. 2 is a front view of a second form of gearing of the present invention.

It will readily be appreciated that any convenient number of combined sets of relatively deformed displaceable teeth and sets of relatively indeformable rigid teeth may be used in the composite gearing of the present invention. For instance, a metal gear 9 sandwiched between two plastic gears 7 may be used, shown in FIG. 2, or a plastic gear sandwiched between two metal gears. The relative gear-widths, diameters and tooth shape and size differences, as well as the properties of the gearing materials may be varied to suit any required situation. For example, instead of metal as described hereinbefore, one may use a hard strong synthetic material or composite of such material with metal or other material, in powered, granular, fibrous or other form. Similarly the relatively deformable gear may comprise powdered, granular, fibrous or other material so long as the desired properties of said gear are obtained.

Clearly, the invention residing to a large extent in the properties p the relatively deformable, displaceable teeth, said teeth may either be an integral part of a gear or gears made wholly of plastic relatively deformable material or, may be present as part of an outer annular covering, with outwardly projecting teeth, which annular covering forms a radial projection of an inner annulus. Such inner annulus may be made for instance of metal. Preferably such covering should have a radial thickness of at least twice the depth of its outer teeth, and more preferably of at least thrice said depth. Said inner annulus may itself be an inner gear made of hard material and said outer annular covering may have indentations in its inner annular surface which mesh in with the teeth of said inner gear. Any convenient method of fixing together such inner and outer annuli may of course be used in practicing the present invention. Furthermore the annular covering for providing displaceable teeth may be of hard material positioned radially outwards of relatively deformable material.

The teeth may be straight, parallel with the shaft axis or inclined to it, or helical or of other shape, so long as the properties and dimensions of the components of the composite gearing are chosen such that the objects of the present invention are accomplished.

A particularly useful application of the present invention has been found in the application to the draw-roll box of a draw-twister operating at high speed. In this case there is normally one hard gear, usually a metal gear rotating on a nonintersecting axis at right angles to that of another hard gear, the teeth of each gear being sloped and shaped accordingly. Noise from such a draw-roll box was very considerably reduced using the composite gearing of the present invention, a hard, metal gear taking any temporary overload.

Where necessary, of course, one composite gearing of the present invention may be used in engagement with one or more other gears or sets of gearing. These latter may be composite gearing of the type of the present invention or, preferably, one may mesh composite gearing of the present invention with a gear made totally of metal or hard plastic etc.

The component gears of the composite gearing of the present invention may be separate and slide separately onto a shaft, for instance over a key or keys, or the component gear may be bonded or fixed together in any other suitable manner to form integral composite gearing.

EXAMPLE

Figure 3:
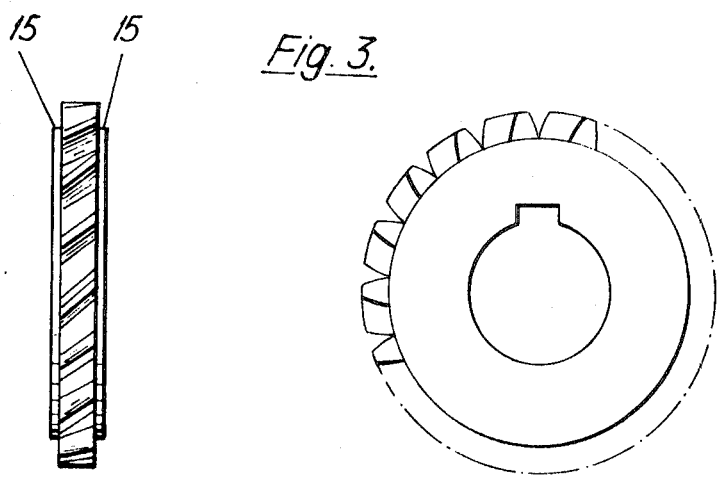
FIG. 3 shows a side and front view of a relatively rigid indeformable gear of the gear assembly as described in the example hereinafter.

Composite gearing of the present invention was made, consisting of a relatively indeformable rigid phosphor bronze gear sandwiched between two polyurethane gears presenting relatively deformable displaceable teeth. Said phosphor bronze gear had integral spacer plates on each side, as shown by 15 in FIG. 3, in order to prevent rubbing between its teeth and the polyurethane teeth. The characteristics of the aforesaid gears are as shown below:

1. Polyurethane gears
   Material: Polyurethane (Dunlop Prescollan, Grade 7301 a trade name).
   Hardness: International Rubber Hardness Degrees: (British Standard 903 Part A26 (1969)
   I.R.H.D.=95
   Tensile Strength: 4,000 lb.-in.$^{12}$
   Rebound Resilience (British Standard 903 Part A8, (1963))=57 percent
   Made by casting.
   Dimensions etc.
   Shaft-hole diameter: 0.98 inch
   Overall diameter (including teeth): 2.5 inches
   Gear Width: 0.31 inches
   Teeth: 45° Helix; No. =17; shape involute as in FIG. 3.
   No integral spacer plates 15.
2. Phosphor-bronze Gear (FIG. 4)
   Material: Phosphor-bronze
   Shaft-hole diameter: 0.98 inch
   Overall diameter (including teeth): 2.48 inches
   Gear Width: 0.22 inch
   Teeth: 45° Helix; No. =17; Shape involute as in FIG. 3; tooth depth 0.17 inch Torque Characteristics of Assembled Composite Gearing Static torque measurements were made at five positions, at increments of one-fifth the circular pitch, the composite gearing being rotated against a mating rigidly clamped matched metal gear. Each measurement gave a torque in excess of 100 lb.-in. before making full contact between the metal member of the composite gearing and the fixed metal gear.

Noise Reduction

A first measure of noise is the overall "linear" sound-pressure level in decibels relative to 0.0002 microbar. For a 16-position draw-box fitted totally with all-metal gears, the reductions in overall "linear" levels at various draw-roll speeds, due to changing from totally all-metal gears to a system in which no two all-metal gears were in contact (using eight sets of composite gearing of the present invention) are shown in the following table 1.

TABLE 1.—OVERALL "LINEAR" SOUND PRESSURE LEVEL

| Gearing | Draw-roll speed, r.p.m. | | | |
|---|---|---|---|---|
| | 3,000 | 4,000 | 5,000 | 6,000 |
| Totally all-metal gears | 84 | 87 | 88 | 93 |
| Normal all-metal gears meshing with composite gearing | 80 | 82 | 84 | 86 |

While these reductions are significant and worthwhile, the full advantage of the gearing of the present invention is not revealed by overall "linear" sound-pressure level, since there is no indication of the variation of sound energy with frequency. More useful information is obtained by making an octave-band analysis of the sound-pressure level and this has the further advantage of providing data for comparison with established Noise Rating Curves, used to assess the risk of noise-induced hearing loss to those exposed to the measured noise. It should be noted that higher levels of octave-band sound pressure can be accepted in the lower frequency ranges. Hence reduction in high frequency noise is an important requirement, if not the only requirement in some noise control problems.

Table 2 gives the measured octave-band sound-pressure levels for the draw-roll speed of 6,000 r.p.m. in three different conditions.

TABLE 2.—OCTAVE-BAND SOUND PRESSURE LEVELS

| Gearing | Octave-band centre frequency, Hertz | | | | | | | |
|---|---|---|---|---|---|---|---|---|
| | 63 | 125 | 250 | 500 | 1,000 | 2,000 | 4,000 | 8,000 |
| Totally all metal gears | 80 | 85 | 79 | 79 | 83 | 83 | 89 | 72 |
| Normal all-metal gears meshing with composite gearing | 78 | 77 | 78 | 77 | 82 | 77 | 69 | 65 |
| No gears on the draw-roll shafts; draw-rolls stationary | 79 | 74 | 78 | 74 | 79 | 73 | 68 | 68 |

It can be seen that the main noise reduction, of 20 decibels occur in the 4,000 Hertz octave-band, in which the sound-pressure level from totally all-metal gears is very high. Analysis with a 6 percent frequency band width shows a near-to-pure tone within the 4,000 Hertz octave-band, arising from vibration of the draw-roll and its shaft due to gear excitation. Pure tones, such as this, are known to be more damaging to hearing than boradoad-band noise of the same sound-pressure level. The introduction of the composite gearing eliminates this tone.

What I claim is:

1. Composite gearing comprising gears adopted for rotation on a common axis or shaft with their sets of teeth arranged side by side, at least one set of teeth being relatively indeformable rigid teeth material and at least one other set of teeth being relatively deformable displaceable teeth which latter teeth are so arranged that load-bearing faces of same project forwardly of load-bearing faces of the relatively indeformable teeth to an extent such that the teeth of a meshing gear will first contact said forwardly projecting faces which faces may thereafter yield under pressure to an extent such as to permit the teeth of the meshing gear also to move into driving contact with the faces of the relatively indeformable teeth.

2. Composite gearing as claimed in claim 1 wherein the relatively indeformable rigid teeth are made of metal.

3. Composite gearing as claimed in claim 1 wherein the relatively indeformable rigid teeth comprise hard synthetic material.

4. Composite gearing as claimed in claim 1 wherein the relatively indeformable rigid teeth comprise both metal and hard synthetic material.

5. Composite gearing as claimed in claim 1 wherein the relatively deformable displaceable teeth are made of polyurethane.

6. Composite gearing as claimed in claim 1 wherein the relatively deformable teeth comprise polyurethane.

7. Composite gearing as claimed in claim 1 wherein the whole of the gear of which said teeth form a part is made of the same material.

8. Composite gearing as claimed in claim 1 wherein the relatively deformable displaceable teeth form part of an annular covering, which covering forms a projection of an inner annulus the composition of which covering is different from that of the inner annulus of the gear of which said teeth form a part.

9. Composite gearing as claimed in claim 8 wherein said annular covering has a radial thickness of at least twice the depth of its outer teeth.

10. Composite gearing as claimed in claim 8 wherein said annular covering has a radial thickness of at least thrice the depth of its outer teeth.